United States Patent
Ye et al.

(10) Patent No.: US 10,922,717 B2
(45) Date of Patent: Feb. 16, 2021

(54) SYSTEMS AND METHODS FOR ACTIVITY RECOMMENDATION

(71) Applicant: BEIJING DIDI INFINITY TECHNOLOGY AND DEVELOPMENT CO., LTD., Beijing (CN)

(72) Inventors: Zhou Ye, Beijing (CN); Yu Wang, Beijing (CN); Hui Lei, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/980,706

(22) Filed: May 15, 2018

(65) Prior Publication Data

US 2018/0293614 A1    Oct. 11, 2018

Related U.S. Application Data

(63) Continuation of application No. PCT/CN2017/113413, filed on Nov. 28, 2017.

(30) Foreign Application Priority Data

Apr. 7, 2017 (CN) .......................... 201710222438.8

(51) Int. Cl.
- G06Q 30/02 (2012.01)
- G06N 7/00 (2006.01)
- G06N 20/20 (2019.01)

(52) U.S. Cl.
CPC ......... *G06Q 30/0254* (2013.01); *G06N 7/005* (2013.01); *G06N 20/20* (2019.01)

(58) Field of Classification Search
CPC ..... G06Q 30/0254; G06N 20/20; G06N 7/005
See application file for complete search history.

(56) References Cited

U.S. PATENT DOCUMENTS

9,189,968 B2 * 11/2015 Supanc .................... G09B 7/04
2011/0035273 A1    2/2011 Parikh et al.
(Continued)

FOREIGN PATENT DOCUMENTS

| CN | 102968444 A | 3/2013 |
|----|-------------|--------|
| CN | 103473291 A | 12/2013 |

(Continued)

OTHER PUBLICATIONS

"8 Ways to deal with Continuous Variables in Predictive Modeling", Analytics Vidhya Content Team, Nov. 29, 2015 (Year: 2015).*

(Continued)

*Primary Examiner* — William A Brandenburg
(74) *Attorney, Agent, or Firm* — Metis IP LLC

(57) ABSTRACT

The present disclosure relates to systems and methods for operating an online on-demand service platform. The systems may perform the methods to: determine one or more recommendation rules for one or more activities for recommending to one or more candidate users; determine, for each of the one or more activities, one or more preset objects for the activity to achieve on the one or more candidate users; determine, for each of the one or more activities, a completion probability that each of the one or more candidate users will complete the one or more preset objects of the activity; and determine, for each of the one or more activities, at least one target user from the one or more candidate users to send a notice of the activity based on the one or more completion probabilities and the one or more recommendation rules.

20 Claims, 8 Drawing Sheets

(56) References Cited

U.S. PATENT DOCUMENTS

| | | | |
|---|---|---|---|
| 2012/0036037 A1 | 2/2012 | Xiao et al. | |
| 2013/0036012 A1 | 2/2013 | Lin et al. | |
| 2014/0114757 A1 | 4/2014 | Frankel et al. | |
| 2015/0088662 A1 | 3/2015 | Noller et al. | |
| 2015/0363688 A1 | 12/2015 | Gao et al. | |
| 2016/0335260 A1 | 11/2016 | Convertino et al. | |
| 2017/0039589 A1 | 2/2017 | Jung et al. | |
| 2017/0061357 A1 | 3/2017 | Dubey et al. | |
| 2018/0165590 A1* | 6/2018 | Vlassis | G06N 5/045 |

FOREIGN PATENT DOCUMENTS

| | | |
|---|---|---|
| CN | 105260477 A | 1/2016 |
| CN | 105653833 A | 6/2016 |
| CN | 105740323 A | 7/2016 |
| CN | 105979013 A | 9/2016 |
| CN | 106126549 A | 11/2016 |

OTHER PUBLICATIONS

"Lagrangian Relaxation: An Overview", Discrete Mathematics for Bioinformatics WE 07/08, G.W. Klau, Dec. 18, 2007, 14:21 (Year: 2007).*

"E-Commerce Item Recommendation Based on Field-aware Factorization Machine", by Yan et al. Conference: RecSys '15 Challenge, Sep. 16-20, 2015, Vienna, Austria. pp. 1-4 (Year: 2015).*

International Search Report for PCT/CN2017/113413 dated Jan. 29, 2018, 4 pages.

Written Opinion of the International Searching Authority for PCT/CN2017/113413 dated Jan. 29, 2018, 4 pages.

Peng Yan et al., E-Commerce Item Recommendation Based on Field-aware Factorization Machine, Conference : RecSys"15 Challenge, p. 1-4, 2016.

Qian Liu, Recommender System's Demand Characteristics Research Based on the Development of Customer Relationship, Chinese Doctoral Dissertations Full-text Database, 10, 2011.

The Second Office Action in Chinese Application No. 201710222438.8 dated Aug. 14, 2020, 14 pages.

* cited by examiner SYSTEMS AND METHODS FOR ACTIVITY RECOMMENDATION

CROSS-REFERENCE TO RELATED APPLICATIONS

This application is a continuation of International Application No. PCT/CN2017/113413, filed on Nov. 28, 2017, which claims priority of Chinese Application No. 201710222438.8 filed on Apr. 7, 2017, the contents of which are incorporated herein by reference to their entirety.

TECHNICAL FIELD

The present disclosure generally relates to systems and methods for online on-demand service, and in particular, to systems and methods for activity recommendation to users.

BACKGROUND

Online on-demand services based on Internet, such as online taxi services, have become increasingly popular because of their convenience. An online on-demand service platform may recommend activities, such as a discount and hot news, to users. For example, the platform may recommend a coupon of taxi hailing to a user. The platform may recommend activities to users based on preference of each of the users. For example, the platform may recommend traffic news to drivers. It is desirable to provide systems and methods for activity recommendation to improve the accuracy and efficiency of activity recommendation to users.

SUMMARY

According to a first aspect of the present disclosure, a system is provided. The system may include one or more storage media and one or more processors configured to communicate with the one or more storage media. The one or more storage media may store a set of instructions for operating an online on-demand service platform. When executing the set of instructions, the one or more processors may be directed to perform one or more of the following operations. The one or more processors may obtain data of one or more activities associated with the on-demand service for recommending to one or more candidate users associated with the online on-demand service platform. The one or more processors may determine one or more recommendation rules. The one or more processors may determine, for each of the one or more activities, one or more preset objects for the activity to achieve on the one or more candidate users. The one or more processors may determine, for each of the one or more activities, a completion probability that each of the one or more candidate users will complete the one or more preset objects of the activity. The one or more processors may determine, for each of the one or more activities, at least one target user from the one or more candidate users to send a notice of the activity based on the one or more completion probabilities and the one or more recommendation rules.

In some embodiments, to determine the probability that the candidate user will complete the one or more preset objects, the one or more processors may obtain recommendation data of a plurality of historical activities. The one or more processors may generate an estimation model based on the recommendation data of the plurality of historical activities. The one or more processors may determine the one or more completion probabilities based on the estimation model.

In some embodiments, the recommendation data of one of the plurality of historical activities may include at least one of: content of the historical activity, one or more features of the historical activity, a type of the historical activity, an identification of the type of the historical activity, an identification of a user that the historical activity has been recommended to, one or more features of the user that the historical activity has been recommended to, or information indicating whether the user that the historical activity has been recommended to completes one or more preset objects of the historical activity.

In some embodiments, to determine the completion probability that the candidate user will complete the one or more preset objects of the activity, the one or more processors may determine a probability that the candidate user will complete each of the one or more preset objects of the activity. The one or more processors may determine the completion probability that the candidate user will complete the one or more preset objects of the activity by at least one of: selecting one of the one or more probabilities as the completion probability; determining an average value of at least two of the one or more probabilities in response to a determination that a count of the one or more preset object is greater than one; or determining a weighted average value of at least two of the one or more probabilities in response to the determination that the count of the one or more preset object is greater than one.

In some embodiments, to generate the estimation model based on the recommendation data of the plurality of historical activities, the one or more processors may determine a plurality of discrete recommendation parameters each of which indicates whether to recommend the activity to one of the one or more candidate users. The one or more processors may determine whether all of the one or more recommendation rules are satisfied when the activity is recommended to the at least one target user based on the plurality of discrete recommendation parameters. The one or more processors may determine a sum of the at least one completion probability that the at least one target user will complete the one or more preset objects of the activity in response to a determination that all of the one or more recommendation rules are satisfied when the activity are recommended to the at least one target user based on the plurality of discrete recommendation parameters. The one or more processors may determine whether the sum is the largest among other candidate users in the one or more candidate users. The one or more processors may determine the at least one target user for the activity based on the plurality of discrete recommendation parameters.

In some embodiments, the one or more processors may determine the plurality of discrete recommendation parameters for each of the one or more activities based on $$Z = \max_{x_{ij}} \sum_{i=1}^{N} \sum_{j=1}^{M} x_{ij} \times p_{ij},$$

$$p_{ij} \in [0, 1],$$

$$\text{s.t.} \sum_{i=1}^{N} \sum_{j=1}^{M} x_{ij} \times r_{ijk} \leq A_k,$$

$$k \in \{1, 2, \ldots, R\}, r_{ijk} \in \{0, 1\}, x_{ij} \in \{0, 1\},$$

where Z refers to a sum of the completion probabilities that the at least one target user for each of the one or more activities will complete the one or more preset objects of the activity; i refers to one of the one or more activities; j refers to one of the one or more candidate users; N refers to a total number of the one or more activities; M refers to a total number of the one or more candidate users; $x_{ij}$ refers to a discrete recommendation parameter that indicates whether to recommend the one of the one or more activities to the one of the one or more candidate users; $p_{ij}$ refers to the completion probability that the one of the one or more candidate users will complete the one or more preset objects of the one of the one or more activities; k refers to one of the one or more recommendation rules; R refers to a total number of the one or more recommendation rules; $r_{ijk}$ indicates whether the one of the one or more activities is allowed to be recommended to the one of the one or more candidate users under the one of the one or more recommendation rules; and $A_k$ refers to a value associated with the one or more recommendation rules.

In some embodiments, to determine the at least one target user from the one or more candidate users for the activity based on the one or more probabilities and the one or more recommendation rules, the one or more processors may determine a plurality of continuous recommendation parameters each of which indicates a probability of recommending the activity to one of the one or more candidate users. The one or more processors may determine whether all of the one or more recommendation rules are satisfied based on the plurality of continuous recommendation parameters. The one or more processors may determine, based on the plurality of continuous recommendation parameters, a sum associated with the one or more completion probabilities that the one or more candidate users will complete the one or more preset objects of the activity in response to a determination that all of the one or more recommendation rules are satisfied based on the plurality of discrete recommendation parameters. The one or more processors may determine whether the sum is the largest among other continuous recommendation parameters. The one or more processors may determine, based on the plurality of continuous recommendation parameters, a plurality of discrete recommendation parameters each of which indicates whether to recommend the activity to one of the one or more candidate users. The one or more processors may determine the at least one target user for the activity based on the plurality of discrete recommendation parameters.

In some embodiments, the one or more processors may determine the plurality of continuous recommendation parameters for each of the one or more activities based on $$Z' = \max_{x_{ij}} \sum_{i=1}^{N} \sum_{j=1}^{M} x'_{ij} \times p_{ij},$$

$$p_{ij} \in [0, 1],$$

$$\text{s.t.} \sum_{i=1}^{N} \sum_{j=1}^{M} x'_{ij} \times r_{ijk} \leq A_k,$$

$$k \in \{1, 2, \ldots, R\}, r_{ijk} \in \{0, 1\}, x_{ij} \in \{0, 1\},$$

where Z' refers to a sum associated with the completion probabilities that the one or more candidate users will complete the one or more preset objects of each of the one or more activities; i refers to one of the one or more activities; j refers to one of the one or more candidate users; N refers to a total number of the one or more activities; M refers to a total number of the one or more candidate users; $x_{ij}'$ refers to a continuous recommendation parameter that indicates a probability of recommending the one of the one or more activities to the one of the one or more candidate users; $p_{ij}$ refers to the completion probability that the one of the one or more candidate users will complete the one or more preset objects of the one of the one or more activities; k refers to one of the one or more recommendation rules; R refers to a total number of the one or more recommendation rules; $r_{ijk}$ indicates whether the one of the one or more activities is allowed to be recommended to the one of the one or more candidate users under the one of the one or more recommendation rules; and $A_k$ refers to a value associated with the one or more recommendation rules.

In some embodiments, the one or more processors may determine the plurality of continuous recommendation parameters based on a Lagrange relaxation algorithm.

In some embodiments, the preset object of the activity may include at least one of: an introduction of one or more new users to the online on-demand service platform based on the activity, a scan of the activity, or consumption based on the activity.

According to yet another aspect of the present disclosure, a method is provided. The method may be implemented on a computing device having one or more processors and one or more storage media. The method may include one or more of the following operations. The one or more processors may obtain data of one or more activities associated with an on-demand service for recommending to one or more candidate users associated with an online on-demand service platform. The one or more processors may determine one or more recommendation rules. The one or more processors may determine, for each of the one or more activities, one or more preset objects for the activity to achieve on the one or more candidate users. The one or more processors may determine, for each of the one or more activities, a completion probability that each of the one or more candidate users will complete the one or more preset objects of the activity. The one or more processors may determine, for each of the one or more activities, at least one target user from the one or more candidate users to send a notice of the activity based on the one or more completion probabilities and the one or more recommendation rules.

According to yet another aspect of the present disclosure, a non-transitory computer readable medium may comprise at least one set of instructions for operating an online on-demand service platform. The at least one set of instructions may be executed by one or more processors of a computing device. The one or more processors may obtain data of one or more activities associated with the on-demand service for recommending to one or more candidate users associated with the online on-demand service platform. The one or more processors may determine one or more recommendation rules. The one or more processors may determine, for each of the one or more activities, one or more preset objects for the activity to achieve on the one or more candidate users. The one or more processors may determine, for each of the one or more activities, a completion probability that each of the one or more candidate users will complete the one or more preset objects of the activity. The one or more processors may determine, for each of the one or more activities, at least one target user from the one or more candidate users to send a notice of the activity based on the one or more completion probabilities and the one or more recommendation rules.

According to yet another aspect of the present disclosure, a system is provided. The system may comprise: an obtainment module configured to obtain data of one or more activities associated with an on-demand service for recommending to one or more candidate users associated with an online on-demand service platform; a rule determination module configured to determine one or more recommendation rules; an object determination module configured to determine one or more preset objects for each of the one or more activities to achieve on the one or more candidate users; a probability determination module configured to determine a completion probability that each of the one or more candidate users will complete the one or more preset objects of each of the one or more activities; and a recommendation module configured to determine at least one target user from the one or more candidate users for each of the one or more activities to send a notice of the activity based on the one or more completion probabilities and the one or more recommendation rules.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAIL DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

It will be understood that the term "system," "module," and/or "block" used herein are one method to distinguish different components, elements, parts, section or assembly of different level in ascending order. However, the terms may be displaced by another expression if they achieve the same purpose.

Figure 2:
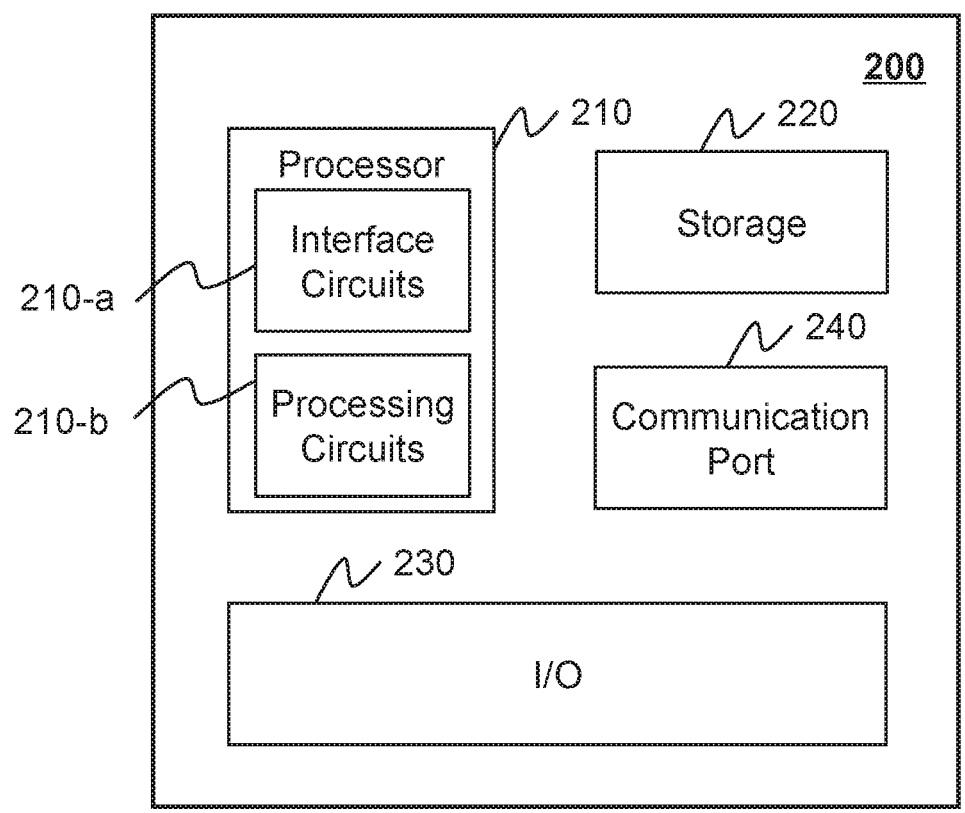
FIG. 2 is a schematic diagram illustrating exemplary hardware and/or software components of a computing device according to some embodiments of the present disclosure.

The term "module," or "block," as used herein, refers to logic embodied in hardware or firmware, or to a collection of software instructions. A module or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., the processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Electrically Programmable Read-Only-Memory (EPROM). It will be further appreciated that hardware modules/units/blocks may be included in connected logic components, such as gates and flip-flops, and/or can be included in programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a module or block is referred to as being "connected to," or "coupled to," another module, or block, it may be directly connected or coupled to, or communicate with the other module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, the system or method of the present disclosure may be applied to other kind of online on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The system or method of the present disclosure may be applied to taxi hailing, chauffeur services, delivery service, carpool, bus service, take-out service, driver hiring, vehicle hiring, bicycle sharing service, train service, subway service, shuttle services, location service, or the like. As another example, the system or method of the present disclosure may be applied to shopping service, learning service, fitness service, financial service, social service, or the like. The application scenarios of the system or method of the present disclosure may include a web page, a plug-in of a browser, a client terminal, a custom system, an internal analysis system, an artificial intelligence robot, or the like, or any combination thereof.

The object of the on-demand service may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

The term "user" in the present disclosure may refer to an individual, an entity, or a tool that may request a service, order a service, provide a service, or facilitate the providing of the service. In the present disclosure, terms "user" and "user terminal" may be used interchangeably.

An aspect of the present disclosure relates to systems and methods for pushing activities (e.g., discounts) relating to an online on-demand service (e.g., a taxi service) to users. An on-demand service platform may consider two factors below when pushing activities to users. First, the on-demand service platform may push, to a user, activities that the user is interest in. For example, when the on-demand service platform pushes a discount to a user, the on-demand service platform may make sure that the user will perform consumption based on the discount. Second, the on-demand service platform may set a limitation for pushing activities. For example, in order to avoid pushing too many activities to a same user, the on-demand service platform may set a limitation that the number of activities that are pushed to a same user is less than or equal to 3.

It should be noted that activity recommendation using online on-demand service system is a new form of activity recommendation deeply rooted in post-Internet era. It provides technical solutions to users raised only in post-Internet era. In pre-Internet era, a user may receive activity recommendation such as a discount related to a service from newspapers, television advertisements, or leaflets. It is difficult to inform users of the activity related to the service in time. In addition, the coverage area of users of the traditional methods of activity recommendation in pre-Internet era is limited. Online on-demand service system, however, recommend activities to larger numbers of users via Internet and ensure that users will not miss the activities. Therefore, through Internet, the online on-demand service systems may provide a much more efficient and accurate recommendation platform for users that may never met in pre-Internet era.

Figure 1:
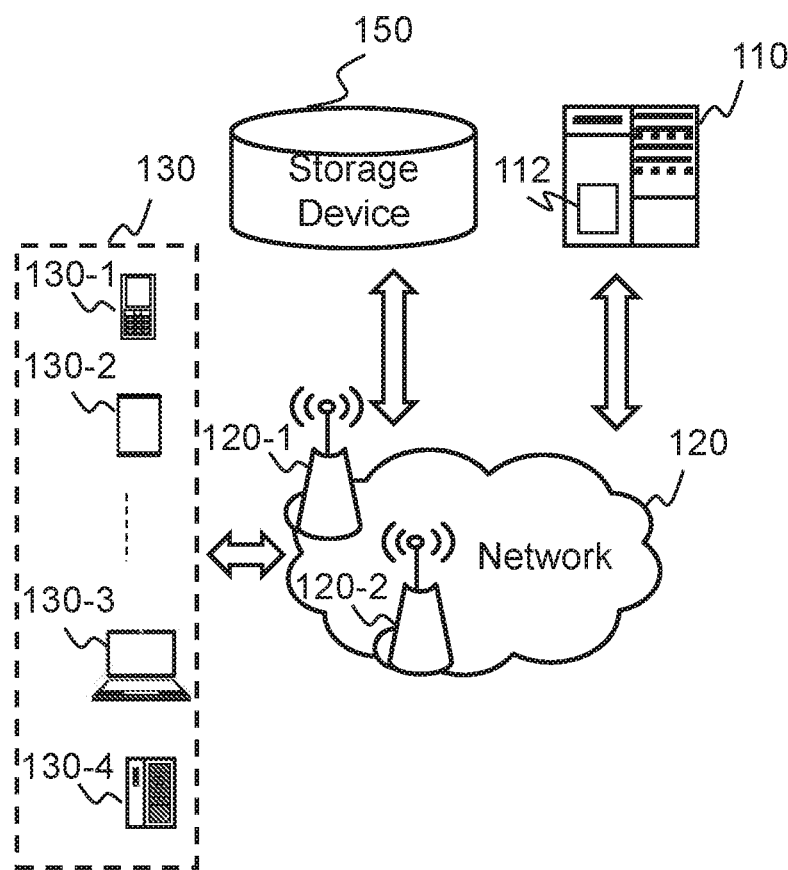
FIG. 1 is a schematic diagram illustrating an exemplary on-demand service system according to some embodiments of the present disclosure.

FIG. 1 is a schematic diagram illustrating an exemplary on-demand service system according to some embodiments of the present disclosure. For example, an on-demand service system 100 may be an online on-demand service system for transportation services (e.g., taxi hailing, chauffeur services, delivery services, carpool, bus services, take-out services, driver hiring, vehicle hiring, train services, subway services, shuttle services), shopping services, fitness services, learning services, financial services, or the like.

The on-demand service system 100 may include a server 110, a network 120, a user terminal 130, and a storage device 150. The server 110 may include a processing engine 112.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the user terminal 130 and/or the storage device 150 via the network 120. As another example, the server 110 may be directly connected to the user terminal 130 and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to activity recommendation. For example, the processing engine 112 may determining at least one user to send a notice of an activity related to a service (e.g., a taxi service). In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the on-demand service system 100 (e.g., the server 110, the user terminal 130, the storage device 150) may send information and/or data to other component(s) in the on-demand service system 100 via the network 120. For example, the processing engine 112 in the server 110 may send a notice of an activity related to a service (e.g., a taxi service) to the user terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, the user terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc.

The storage device 150 may store data and/or instructions. In some embodiments, the storage device 150 may store data obtained from the user terminal 130 and/or the server 110. For example, the storage device 150 may store recommendation data of historical activities obtained from the user terminal 130. In some embodiments, the storage device 150 may store data and/or instructions that the server 110 may execute or use to perform exemplary methods described in the present disclosure. For example, the storage device 150 may store instructions of determining at least one target user for an activity related to a service (e.g., a taxi service). In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the on-demand service system 100 (e.g., the server 110, the user terminal 130). One or more components in the on-demand service system 100 may access the data or instructions stored in the storage device 150 via the network 120. For example, the processing engine 112 in the server 110 may access the storage device 150 to obtain recommendation data of historical activities. In some embodiments, the storage device 150 may be directly connected to or communicate with one or more components in the on-demand service system 100 (e.g., the server 110, the user terminal 130). In some embodiments, the storage device 150 may be part of the server 110.

FIG. 2 is a schematic diagram illustrating exemplary hardware and/or software components of a computing device on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute instructions (e.g., program code) and perform functions of the processing engine 112 in accordance with techniques described herein. For example, the processor 210 may include interface circuits 210-a and processing circuits 210-b therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded and/or in a form as electronic signals. Then the interface circuits may send out the electronic signals from the processing circuits via the bus.

The instructions may include, for example, routines, programs, objects, components, data structures, procedures, modules, and functions, which perform particular functions described herein. For example, the processor 210 may determine at least one target user for an activity. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the user terminal 130, the storage device 150, and/or any other component of the on-demand service system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store recommendation data of a plurality of historical activities.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the user terminal 130, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
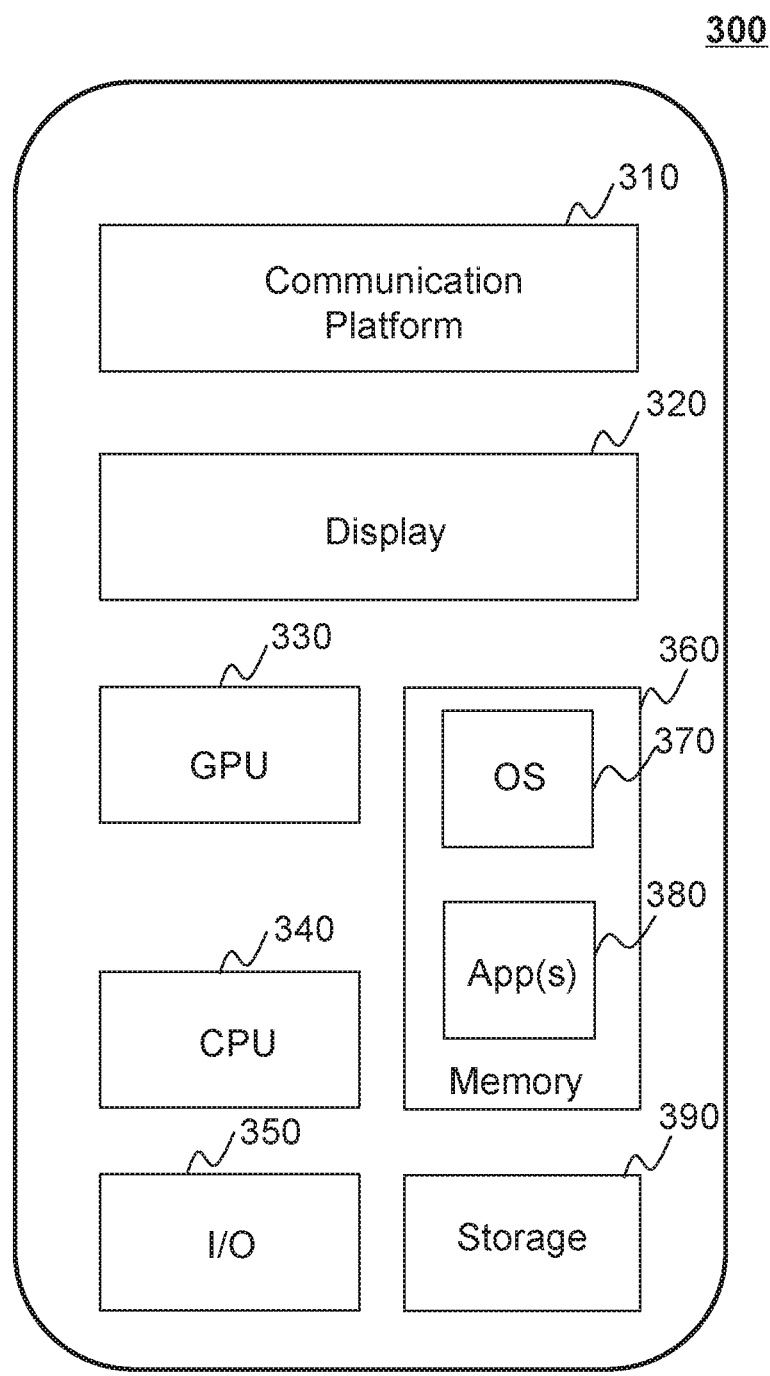
FIG. 3 a schematic diagram illustrating exemplary hardware and/or software components of a mobile device according to some embodiments of the present disclosure.

FIG. 3 a schematic diagram illustrating exemplary hardware and/or software components of a mobile device on which the user terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system (OS) 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving activity recommendation or other information related to an on-demand service from the processing engine 112, and sending information relating to the on-demand service to the processing engine 112. User interactions with the information stream may be achieved via the I/O 350 and provided to the processing engine 112 and/or other components of the system 100 via the network 120.

One of ordinary skill in the art would understand that when an element of the on-demand service system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 sends out data (e.g., a notice of an activity) to the user terminal 130, a processor of the processing engine 112 may generate electrical signals encoding the data. The processor of the processing engine 112 may then send the electrical signals to an output port of the processing engine 112. If the user terminal 130 communicates with the processing engine 112 via a wired network, the output port of the processing engine 112 may be physically connected to a cable, which may further transmit the electrical signals to an input port of the user terminal 130. If the user terminal 130 communicates with the processing engine 112 via a wireless network, the output port of the processing engine 112 may be one or more antennas, which may convert the electrical signals to electromagnetic signals. Within an electronic device, such as the user terminal 130, or the server 110, when a processor thereof processes an instruction, sends out an instruction, and/or performs an action, the instruction and/or action is conducted via electrical signals. For example, when the processor retrieves or saves data from a storage medium (e.g., the storage device 150, the storage 220), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
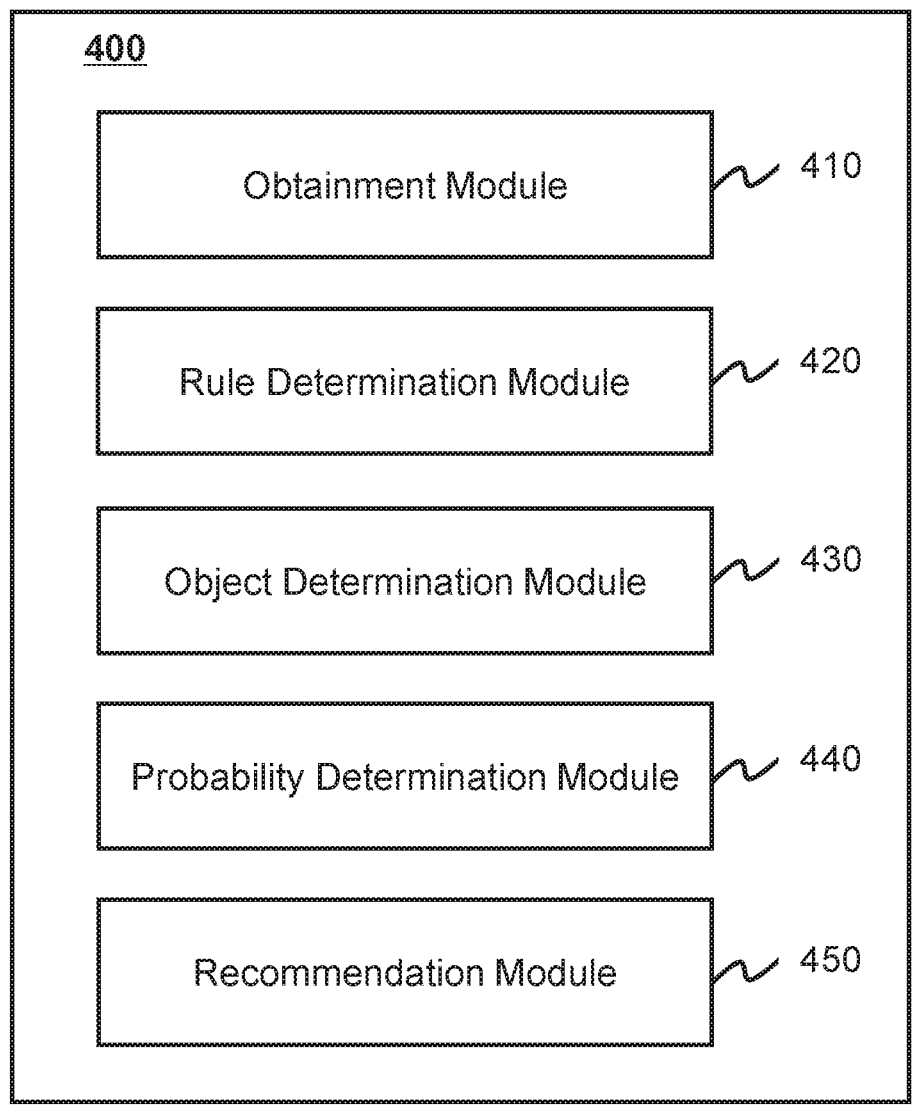
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may be in communication with a storage (e.g., the storage device 150, the user terminal 130, a computer-readable storage) and may execute instructions stored in the computer-readable storage medium. The processing engine 112 may include an obtainment module 410, a rule determination module 420, an object determination module 430, a probability determination module 440, and a recommendation module 450.

The obtainment module 410 may obtain data related to activity recommendation. The obtainment module 410 may obtain the data related to activity recommendation from a storage medium (e.g., the storage device 150, the storage 220, the storage 390).

In some embodiments, the obtainment module 410 may obtain data of one or more activities associated with an on-demand service for recommending to one or more candidate users associated with the on-demand service system 100. In some embodiments, the activity may include a discount, news, an advertisement, or the like, or any combination thereof. For example, for a taxi service, the activity may include a coupon of taking a taxi, an introduction of the real-time road condition, or the like. As another example, for a shopping service, the activity may include an introduction of popular stores, an introduction of hot goods, a discount, or the like.

In some embodiments, the obtainment module 410 may obtain recommendation data of a plurality of historical activities. A historical activity refers to an activity that has been recommended/pushed to one or more users. The recommendation data of a historical activity may include content of the historical activity, one or more features (e.g., a coupon, a red packet) of the historical activity, a type of the historical activity (e.g., a discount of taking a taxi, a discount of vehicle repair, entertainment news, social news, sports news), an identification of the type of the historical activity, an identification of a user that the historical activity has been recommended to, one or more features (e.g., the gender, the age, the job, the address, the place of birth, a feature of new user) of the user that the historical activity has been recommended to, information indicating whether the user that the historical activity has been recommended to completes one or more preset targets of the historical activity, or the like, or any combination thereof.

The rule determination module 420 may determine one or more recommendation rules. The recommendation rule may be used to determine whether an activity is allowed to be recommended to a candidate user. For example, the recommendation rule may be that the number of activities that are recommended to a same candidate user is less than or equal to three. As another example, the recommendation rule may be that a candidate user that is a new user associated with the on-demand service system 100 can receive a coupon of which the price is less than five dollars. As still another example, the recommendation rule may be that a specific activity of the one or more activities must be recommended to all of the one or more candidate users.

The object determination module 430 may determine one or more preset objects (and/or goals) for each of the one or more activities to achieve on the one or more candidate users. The preset object of an activity may indicate a response that a candidate user is desired to make to the activity. For example, the preset object of an activity may be an introduction of one or more new users to the on-demand service system 100 based on the activity, a scan of the activity, or consumption based on the activity. In some embodiments, the preset objects for different activities may be different. For example, for a discount of taking a taxi, the object determination module 430 may determine that the preset object is the consumption based on the discount. As another example, for an introduction of the real-time road condition, the object determination module 430 may determine that the preset object is the scan of the introduction of the real-time road condition. In some embodiments, the number of the one or more preset objects of each of the one or more activities may be same or different. For example, one of the one or more activities may include three preset objects. Another of the one or more activities may include four preset objects.

The probability determination module 440 may determine a completion probability that each of the one or more candidate users will complete the one or more preset objects of each of the one or more activities. In some embodiments, a completion probability may be equal to an average value of at least two of probabilities that a candidate user will respectively complete one or more preset objects of an activity, a weighted average value of at least two of the probabilities that the candidate user will respectively complete the one or more preset objects of the activity, or one of the probabilities that the candidate user will respectively complete the one or more preset objects of the activity. For example, an activity of a coupon of taking a taxi may include 2 preset objects such as a scan of the activity and consumption using the coupon. The probability determination module 440 may determine that the probability that a candidate user will scan the activity is 40%, and the probability that the candidate user will use the coupon is 30%. The probability determination module 440 may determine an average value of the probability that the candidate user will use the coupon and the probability that the candidate user will scan the activity as the completion probability corresponding to the candidate user and the activity and determine that the completion probability is 35% (e.g., (30%+40%)/2=35%). Alternatively, the probability determination module 440 may determine the probability that the candidate user will use the coupon (or the probability that the candidate user will scan the activity) as the completion probability corresponding to the candidate user and the activity and determine that the completion probability is 35% (or 40%).

The recommendation module 450 may determine at least one target user from the one or more candidate users for each of the one or more activities to send a notice of each of the one or more activities based on the one or more completion probabilities and the one or more recommendation rules. In some embodiments, for each of the one or more activities, the recommendation module 450 may recommend the activity to the at least one target user for the activity by sending the notice of the activity to at least one user terminal associated with the at least one target user. The user terminal may receive the notice of the activity in the form of electronic coupons, articles, links, or the like, or any combination thereof.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee, a Near Field Communication (NFC), an infrared connection, or the like, or any combination thereof. Two or more of the modules may be combined into a single module, and any one of the modules may be divided into two or more units. For example, the obtainment module 410 may be divided into two units. A first unit may obtain data of one or more activities. A second unit may obtain recommendation data of a plurality of historical activities.

It should be noted that the processing engine 112 described above is provided for illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, the processing engine 112 may further include a storage module (not shown in FIG. 4). The storage module may be configured to store data generated during any process performed by any component of in the processing engine 112. As another example, each of components of the processing engine 112 may associate with a storage module. Additionally or alternatively, the components of the processing engine 112 may share a common storage module.

Figure 5:
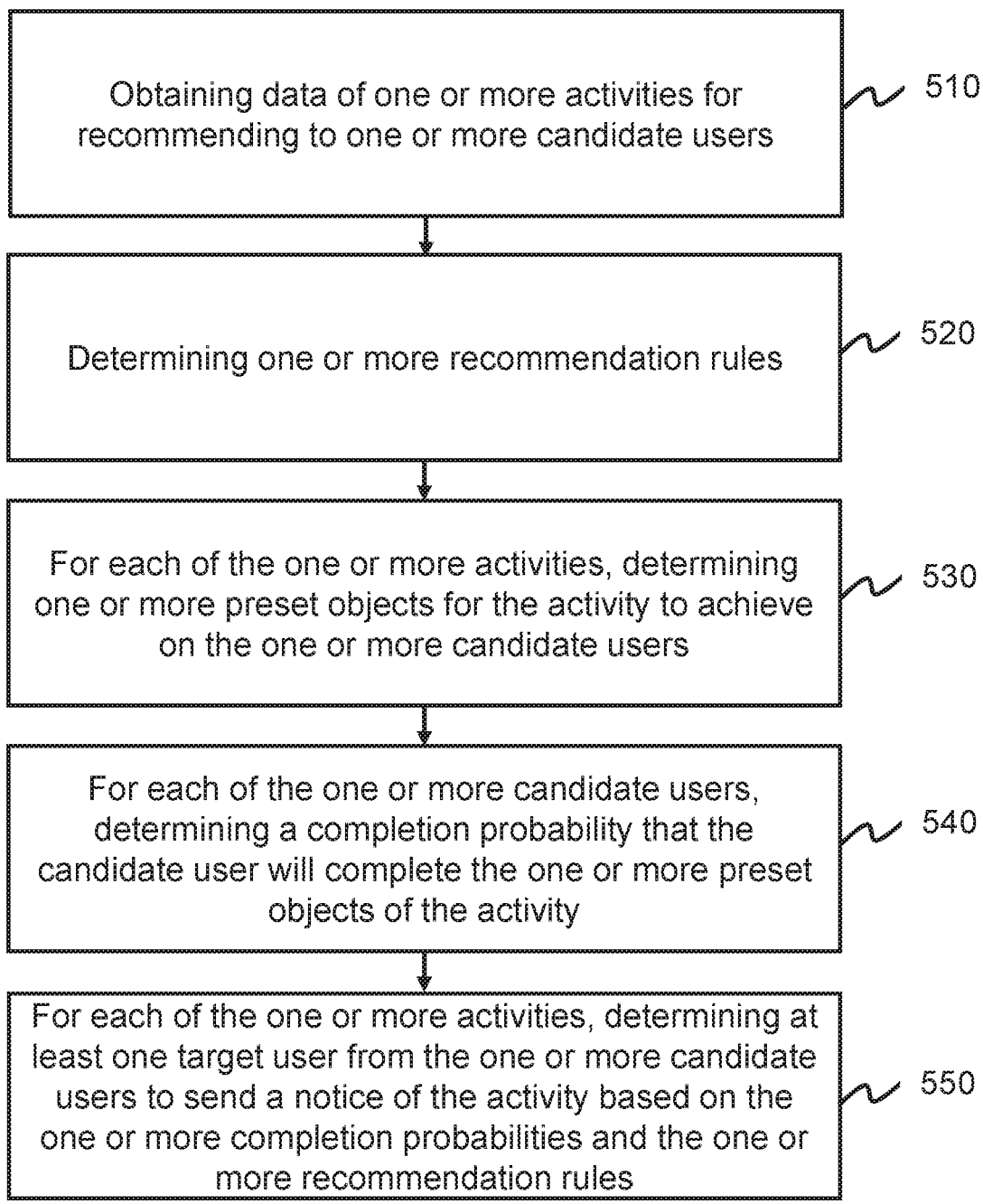
FIG. 5 is a flowchart illustrating an exemplary process for activity recommendation according to some embodiments of the present disclosure.

FIG. 5 is a flowchart of an exemplary process for activity recommendation according to some embodiments of the present disclosure. Process 500 may be implemented in the on-demand service system 100 illustrated in FIG. 1. For example, the process 500 may be stored in the storage device 150 and/or the storage 220 as a form of instructions (e.g., an application), and invoked and/or executed by the server 110 (e.g., the processing engine 112, the processor 210 illustrated in FIG. 2, or one or more modules in the processing engine 112 illustrated in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the obtainment module 410 (or the processing engine 112, and/or the interface circuits 210-a) may obtain data of one or more activities associated with an on-demand service for recommending to one or more candidate users associated with the on-demand service system 100. In some embodiments, the activity may include a discount, news, an advertisement, or the like, or any combination thereof. For example, for a taxi service, the activity may include a coupon of taking a taxi, an introduction of the real-time road condition, or the like. As another example, for a shopping service, the activity may include an introduction of hot stores, an introduction of hot goods, a discount, or the like.

In 520, the rule determination module 420 (or the processing engine 112, and/or the interface circuits 210-a) may determine one or more recommendation rules. The recommendation rule may be used to determine whether an activity is allowed to be recommended to a candidate user. For example, the recommendation rule may be that the number of activities that are recommended to a same candidate user is less than or equal to three. As another example, the recommendation rule may be that a candidate user that is a new user associated with the on-demand service system 100 can receive a coupon of which the price is less than five dollars. As still another example, the recommendation rule may be that a specific activity of the one or more activities must be recommended to all of the one or more candidate users.

In 530, the object determination module 430 (or the processing engine 112, and/or the interface circuits 210-a) may determine one or more preset objects for each of the one or more activities to achieve on the one or more candidate users. The preset object of an activity may indicate a response that a candidate user is desired to make to the activity. For example, the preset object of an activity may be an introduction of one or more new users to the on-demand service system 100 based on the activity, a scan of the activity, or consumption based on the activity. In some embodiments, the preset objects for different activities may be different. For example, for a discount of taking a taxi, the object determination module 430 may determine that the preset object is the consumption based on the discount. As another example, for an introduction of the real-time road condition, the object determination module 430 may determine that the preset object is the scan of the introduction of the real-time road condition.

In 540, the probability determination module 440 (or the processing engine 112, and/or the interface circuits 210-a) may determine a completion probability that each of the one or more candidate users will complete the one or more preset objects of each of the one or more activities. In some embodiments, a completion probability may be equal to an average value of at least two of probabilities that a candidate user will respectively complete one or more preset objects of an activity, a weighted average value of at least two of the probabilities that the candidate user will respectively complete the one or more preset objects of the activity, or one of the probabilities that the candidate user will respectively complete the one or more preset objects of the activity.

Figure 6:
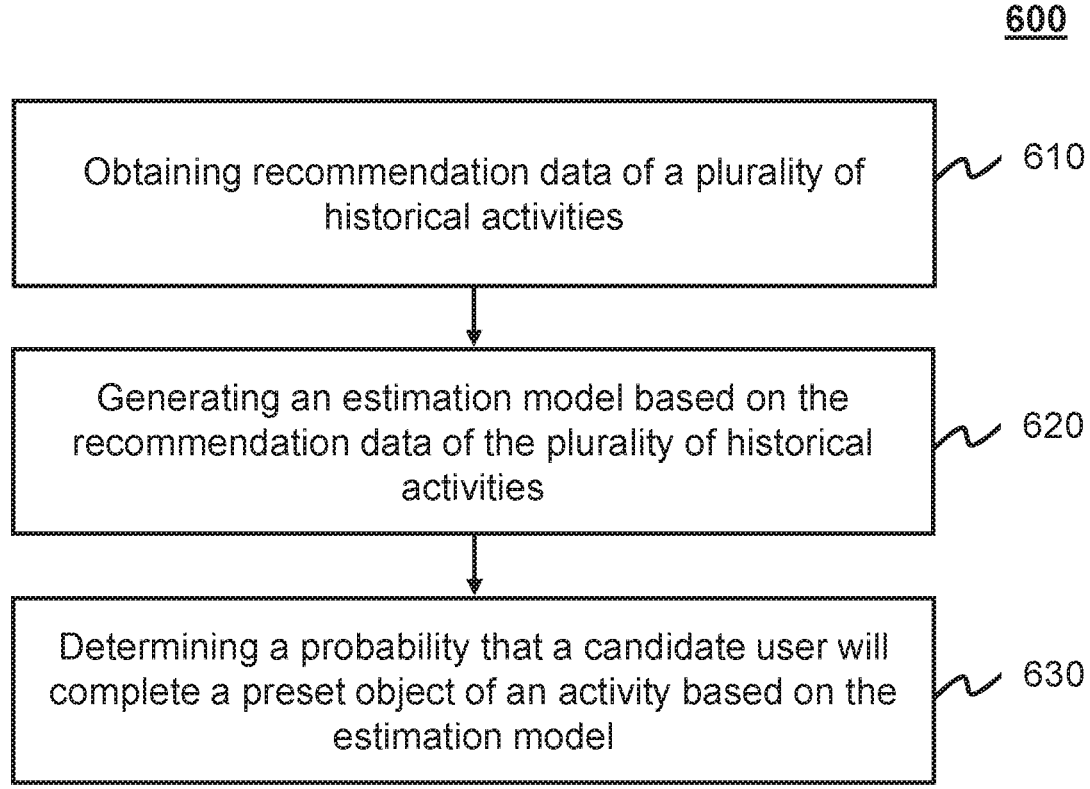
FIG. 6 is a flowchart of an exemplary process for determining a probability that a candidate user will complete a preset object of an activity according to some embodiments of the present disclosure.

In some embodiments, the probability determination module 440 may determine the probability that a candidate user will complete one of the one or more preset objects of an activity based on recommendation data of a plurality of historical activities (e.g., as described elsewhere in this disclosure in connection with FIG. 6).

In 550, the recommendation module 450 (or the processing engine 112, and/or the interface circuits 210-a) may determine at least one target user from the one or more candidate users for each of the one or more activities to send a notice of each of the one or more activities based on the one or more completion probabilities and the one or more recommendation rules. When the recommendation module 450 recommends the one or more activities to the target users, the one or more recommendation rules may be satisfied and a sum of the one or more completion probabilities that the target users will complete the one or more preset objects of the one or more activities are largest among other candidate users of the one or more candidate users (e.g., as described elsewhere in this disclosure in connection with FIG. 7 and/or FIG. 8)

In some embodiments, for each of the one or more activities, the recommendation module 450 may recommend the activity to the at least one target user for the activity by sending the notice of the activity to at least one user terminal associated with the at least one target user. The user terminal may receive the notice of the activity in the form of electronic coupons, articles, links, or the like, or any combination thereof.

It should be noted that the processing engine 112 described above is provided for the purposes of illustration, and not intended to limit the scope of the present disclosure. Apparently, for persons having ordinary skills in the art, numerous variations and modifications may be conducted under the teaching of the present disclosure. However, those variations and modifications do not depart the protection scope of the present disclosure. In some embodiments, the number of the one or more preset objects of each of the one or more activities may be same or different. For example, one of the one or more activities may include three preset objects. Another of the one or more activities may include four preset objects.

FIG. 6 is a flowchart of an exemplary process for determining a probability that a candidate user will complete a preset object of an activity according to some embodiments of the present disclosure. Process 600 may be implemented in the on-demand service system 100 illustrated in FIG. 1. For example, the process 600 may be stored in the storage device 150 and/or the storage 220 as a form of instructions (e.g., an application), and invoked and/or executed by the server 110 (e.g., the processing engine 112, the processor 210 illustrated in FIG. 2, or one or more modules in the processing engine 112 illustrated in FIG. 4). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, step 540 of process 500 illustrated in FIG. 5 may be performed according to process 500.

In 610, the obtainment module 410 (or the processing engine 112, and/or the interface circuits 210-*a*) may obtain recommendation data of a plurality of historical activities. A historical activity refers to an activity that has been recommended to one or more users. The recommendation data of a historical activity may include content of the historical activity, one or more features (e.g., a coupon, a red packet) of the historical activity, a type of the historical activity (e.g., a discount of taking a taxi, a discount of vehicle repair, entertainment news, social news, sports news), an identification of the type of the historical activity, an identification of a user that the historical activity has been recommended to, one or more features (e.g., the gender, the age, the job, the address, the place of birth, a feature of new user) of the user that the historical activity has been recommended to, information indicating whether the user that the historical activity has been recommended to completes one or more preset targets of the historical activity, or the like, or any combination thereof. In some embodiments, the feature of the user and/or the feature of the historical activity may be described by a keyword (e.g., "coupon," "female," "teacher," "new user," "Beijing"). In some embodiments, the feature of the user and/or the feature of the historical activity may be described by a number. For example, for the feature of the gender of the user, the number "0" represents female, and the number "1" represents male.

In 620, the probability determination module 440 (or the processing engine 112, and/or the interface circuits 210-*a*) may generate an estimation model based on the recommendation data of the plurality of historical activities. In some embodiments, the probability determination module 440 may input a plurality of preliminary characteristics of the recommended data to a deep learning model or a gradient boosting decision tree (GBDT) model. For example, for a historical activity, the probability determination module 440 may input "a discount of taking a taxi," "coupon," "female," "teacher," "new user," "Beijing," and "no consumption." The probability determination module 440 may operate the deep learning model or GBDT model to obtain a plurality of refined characteristics of the recommendation data based on the plurality of preliminary characteristics. The refined characteristic may be a combination of at least two of the plurality of preliminary characteristics. For example, a refined characteristic may indicate a probability of using a recommended coupon of a female user is higher than that of a male user.

In some embodiments, the probability determination module 440 may operate the deep learning model or GBDT model to initiate a plurality of iterations to obtain the refined characteristics. In each of the plurality of iterations, the probability determination module 440 may operate the deep learning model or GBDT model to obtain new characteristics by combining at least two of previous characteristics obtained in a previous iteration. In the first iteration, the previous characteristics may be the plurality of preliminary characteristics. The probability determination module 440 may determine the characteristics obtained in the last iteration as the refined characteristics and generate the estimation model based on the refined characteristics.

In 630, the probability determination module 440 (or the processing engine 112, and/or the interface circuits 210-*a*) may determine a probability that a candidate user will complete one of the one or more preset objects of an activity based on the estimation model. For example, the probability determination module 440 may input the type of the activity, the identification of the activity, the identification of the candidate user, one or more features of the candidate user, and the preset object of the activity to the estimation model. The estimation model may output the probability that the candidate user will complete the preset object of the activity based on the input.

In some embodiments, the probability determination module 440 may generate the estimation model off line and store the estimation model in the storage medium (e.g., the storage device 150, the storage 220). The probability determination module 440 may access the storage medium to obtain the estimation model and determine the probability based on the estimation model.

Figure 7:
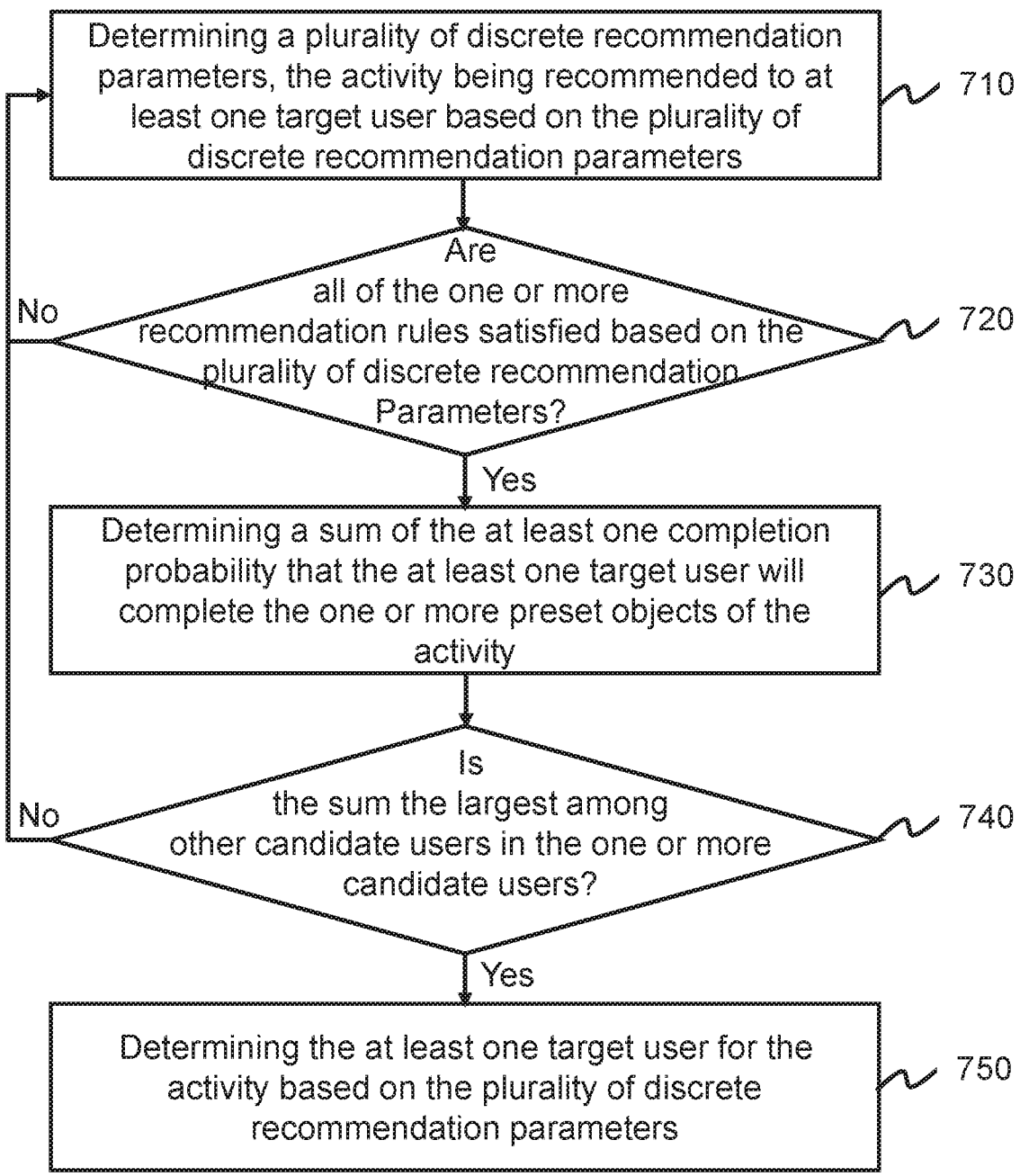
FIG. 7 is a flowchart of an exemplary process for determining at least one target user from the one or more candidate users for each of one or more activities according to some embodiments of the present disclosure.

FIG. 7 is a flowchart of an exemplary process for determining at least one target user from the one or more candidate users for each of one or more activities according to some embodiments of the present disclosure. Process 700 may be implemented in the on-demand service system 100 illustrated in FIG. 1. For example, the process 700 may be stored in the storage device 150 and/or the storage 220 as a form of instructions (e.g., an application), and invoked and/or executed by the server 110 (e.g., the processing engine 112, the processor 210 illustrated in FIG. 2, or one or more modules in the processing engine 112 illustrated in FIG. 4), The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, step 550 of process 500 illustrated in FIG. 5 may be performed according to process 700.

In 710, the recommendation module 450 (or the processing engine 112, and/or the interface circuits 210-*a*) may determine a plurality of discrete recommendation parameters. The discrete recommendation parameter may indicate whether one of the one or more activities is allowed to be recommended to one of the one or more candidate users. The activity may be recommended to at least one target user of the one or more candidate users based on the plurality of discrete recommendation parameters. In some embodiments, the discrete recommendation parameter may be 0 or 1. The discrete recommendation parameter of 0 indicates the one of the one or more activities is not allowed to be recommended to the one of the one or more candidate users. The discrete recommendation parameter of 1 indicates the one of the one or more activities is allowed to be recommended to the one of the one or more candidate users.

In 720, the recommendation module 450 (or the processing engine 112, and/or the interface circuits 210-*a*) may determine whether all of the one or more recommendation rules are satisfied based on the plurality of discrete recommendation parameters. The process 700 may proceed to 730 in response to a determination that all of the one or more recommendation rules are satisfied based on the plurality of discrete recommendation parameters. The process 700 may proceed to 710 to determine a plurality of new discrete recommendation parameters in response to a determination that at least one of the one or more recommendation rules is not satisfied based on the plurality of discrete recommendation parameters.

In 730, the recommendation module 450 (or the processing engine 112, and/or the interface circuits 210-*a*) may determine a sum of the at least one completion probability that the at least one target user will complete the one or more preset objects of the activity.

In 740, the recommendation module 450 (or the processing engine 112, and/or the interface circuits 210-*a*) may determine whether the sum is the largest among other candidate users in the one or more candidate users. The process 700 may proceed to 750 in response to a determination that the sum is the largest among other candidate users in the one or more candidate users. The process 700 may proceed to 710 to determine a plurality of new discrete recommendation parameters in response to a determination that the sum is not the largest among other candidate users in the one or more candidate users.

In 750, the recommendation module 450 (or the processing engine 112, and/or the interface circuits 210-*a*) may determine the at least one target user for the activity based on the plurality of discrete recommendation parameters.

In some embodiments, the recommendation module 450 may determine the plurality of discrete recommendation parameters based on Equation (1) below:

$$Z = \max_{x_{ij}} \sum_{i=1}^{N} \sum_{j=1}^{M} x_{ij} \times p_{ij}, \quad (1)$$

$$p_{ij} \in [0, 1],$$

$$\text{s.t.} \sum_{i=1}^{N} \sum_{j=1}^{M} x_{ij} \times r_{ijk} \leq A_k,$$

$$k \in \{1, 2, \ldots, R\}, r_{ijk} \in \{0, 1\}, x_{ij} \in \{0, 1\},$$

where Z refers to a sum of the completion probabilities that the at least one target user for each of the one or more activities will complete the one or more preset objects of the activity; i refers to one of the one or more activities; j refers to one of the one or more candidate users; N refers to a total number of the one or more activities; M refers to a total number of the one or more candidate users; $x_{ij}$ refers to a discrete recommendation parameter that indicates whether to recommend the one of the one or more activities to the one of the one or more candidate users; $p_{ij}$ refers to the completion probability that the one of the one or more candidate users will complete the one or more preset objects of the one of the one or more activities; k refers to one of the one or more recommendation rules; R refers to a total number of the one or more recommendation rules; $r_{ijk}$ indicates whether the one of the one or more activities is allowed to be recommended to the one of the one or more candidate users under the one of the one or more recommendation rules; and $A_k$ refers to a value associated with the one of the one or more recommendation rules.

In some embodiments, $r_{ijk}$ may be equal to 0 or 1. $r_{ijk}=0$ indicates the one of the one or more activities is not allowed to be recommended to the one of the one or more candidate users under the one of the one or more recommendation rules. $r_{ijk}=1$ indicates the one of the one or more activities is allowed to be recommended to the one of the one or more candidate users under the one of the one or more recommendation rules.

In some embodiments, the recommendation module 450 may determine $r_{ijk}$ based on the recommendation rule. For example, the recommendation rule may be that the number of activities allowed to be recommended to a same candidate user is not greater than 3. The recommendation module 450 may determine that $A_k$ is equal to 3N. The recommendation module 450 may determine $r_{ijk}$ based on Equation (2) below:

$$\Sigma_{i=1}^{N} \Sigma_{j=1}^{M} r_{ijk} \leq 3 \text{ N}, \quad (2)$$

As another example, the recommendation rule may be that a candidate user that is a new user can only receive a coupon of which the price is less than 5 dollars. For user j that is a new user and activity i of a coupon of which the price is greater than 5 dollars, $r_{ijk}$ may be equal to 0. As still another example, the recommendation rule may be that activity i must be recommended to all of the one or more candidate users, and $r_{ijk}$ may be equal to 1.

Merely by way of example, there are two candidate users (e.g., a first user and a second user) and two activities (e.g., a first activity and a second activity). The recommendation module 450 may determine that $x_{11}=1$, $x_{12}=0$, $x_{21}=0$, and $x_{22}=1$. For the first activity, the recommendation module 450 may determine the first user as the target user and recommend the first activity to the first user. For the second activity, the recommendation module 450 may determine the second user as the target user and recommend the second activity to the second user.

Figure 8:
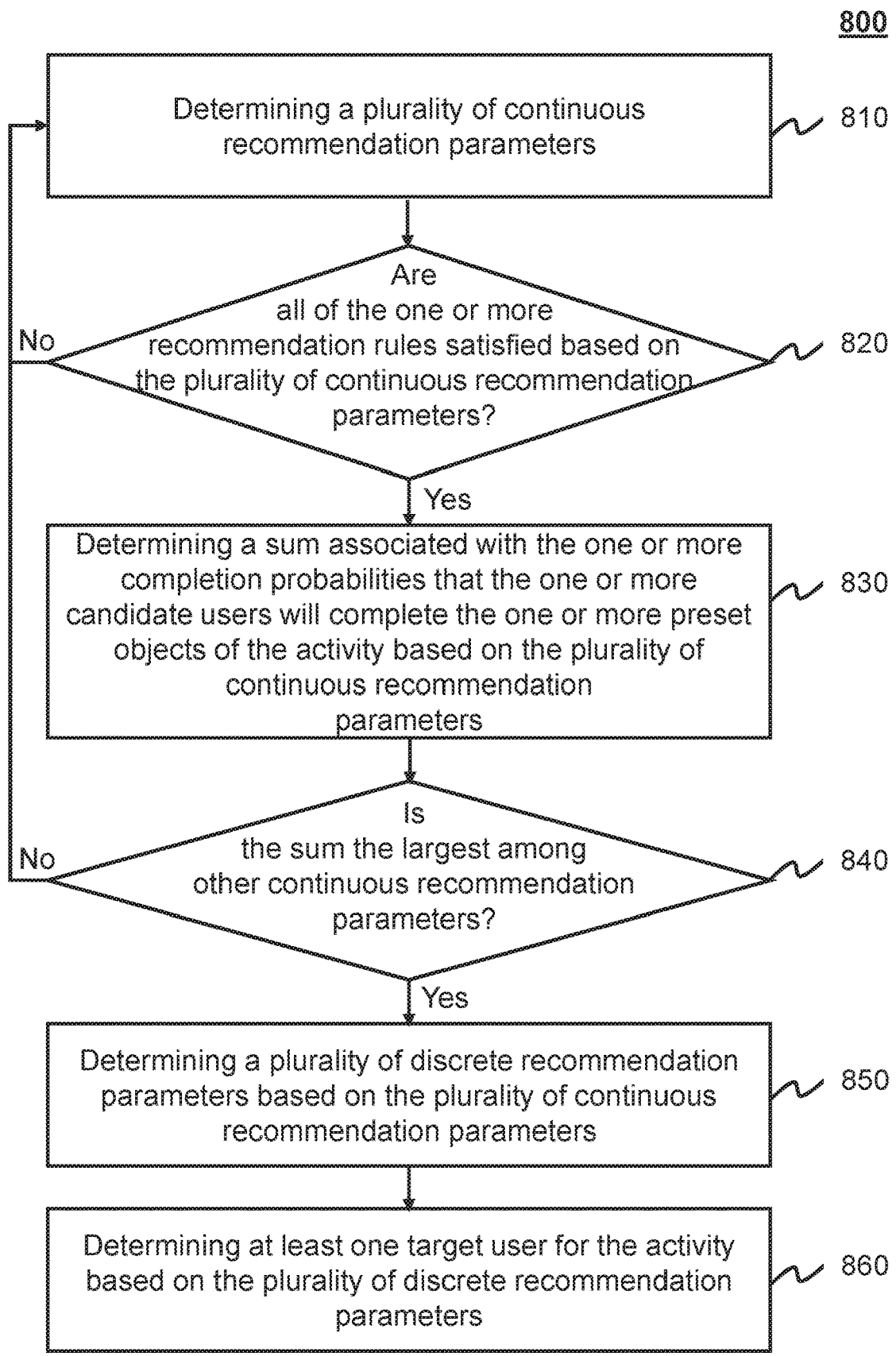
FIG. 8 is a flowchart of an exemplary process for determining at least one target user from the one or more candidate users for each of one or more activities according to some embodiments of the present disclosure.

FIG. 8 is a flowchart of an exemplary process for determining at least one target user from the one or more candidate users for each of one or more activities according to some embodiments of the present disclosure. Process 800 may be implemented in the on-demand service system 100 illustrated in FIG. 1. For example, the process 800 may be stored in the storage device 150 and/or the storage 220 as a form of instructions (e.g., an application), and invoked and/or executed by the server 110 (e.g., the processing engine 112, the processor 210 illustrated in FIG. 2, or one or more modules in the processing engine 112 illustrated in FIG. 4). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, step 550 of process 500 illustrated in FIG. 5 may be performed according to process 800.

In 810, the recommendation module 450 (or the processing engine 112, and/or the interface circuits 210-a) may determine a plurality of continuous recommendation parameters. The continuous recommendation parameter may indicate a probability of recommending the activity to one of the one or more candidate users. In some embodiments, the continuous recommendation parameter may be any number that is within the range of [0, 1].

In 820, the recommendation module 450 (or the processing engine 112, and/or the interface circuits 210-a) may determine whether all of the one or more recommendation rules are satisfied based on the plurality of continuous recommendation parameters. The process 800 may proceed to 830 in response to a determination that all of the one or more recommendation rules are satisfied based on the plurality of continuous recommendation parameters. The process 800 may proceed to 810 to determine a plurality of new continuous recommendation parameters in response to a determination that at least one of the one or more recommendation rules is not satisfied based on the plurality of continuous recommendation parameters.

In 830, the recommendation module 450 (or the processing engine 112, and/or the interface circuits 210-a) may determine a sum associated with the one or more completion probabilities that the one or more candidate users will complete the one or more preset objects of the activity based on the plurality of continuous recommendation parameters. In some embodiments, the sum may be the sum of products each of which relates to a completion probability and a corresponding continuous recommendation parameter.

In 840, the recommendation module 450 (or the processing engine 112, and/or the interface circuits 210-a) may determine whether the sum is the largest among other continuous recommendation parameters. The process 800 may proceed to 850 in response to a determination that the sum is the largest among other continuous recommendation parameters. The process 800 may proceed to 810 to determine a plurality of new continuous recommendation parameters in response to a determination that the sum is not the largest among other continuous recommendation parameters.

In 850, the recommendation module 450 (or the processing engine 112, and/or the interface circuits 210-a) may determine a plurality of discrete recommendation parameters based on the plurality of continuous recommendation parameters. In some embodiments, if a continuous recommendation parameter is less than a threshold (e.g., 0.5), the recommendation module 450 may determine a corresponding discrete recommendation parameter as 0. If the continuous recommendation parameter is greater than or equal to the threshold (e.g., 0.5), the recommendation module 450 may determine the corresponding discrete recommendation parameter as 1.

In 860, the recommendation module 450 (or the processing engine 112, and/or the interface circuits 210-a) may determine at least one target user for the activity based on the plurality of discrete recommendation parameters.

In some embodiments, the recommendation module 450 may determine the plurality of continuous recommendation parameters based on Equation (3) below:

$$Z' = \max_{x_{ij}} \sum_{i=1}^{N} \sum_{j=1}^{M} x'_{ij} \times p_{ij}, \quad (3)$$

$$p_{ij} \in [0, 1],$$

$$\text{s.t.} \sum_{i=1}^{N} \sum_{j=1}^{M} x'_{ij} \times r_{ijk} \leq A_k,$$

$$k \in \{1, 2, \ldots, R\}, r_{ijk} \in \{0, 1\}, x'_{ij} \in [0, 1],$$

where $Z'$ refers to a sum associated with the one or more completion probabilities that the one or more candidate users will complete the one or more preset objects of the activity; and $x_{ij}'$ refers to a continuous recommendation parameter that indicates a probability of recommending one of the one or more activities to one of the one or more candidate users.

In some embodiments, the recommendation module 450 may determine the plurality of continuous recommendation parameters using a Lagrange relaxation algorithm, a Newton algorithm, a conjugate gradient algorithm, or the like, or any combination thereof.

Merely by way of example, there are two candidate users (e.g., a first user and a second user) and two activities (e.g., a first activity and a second activity). The recommendation module 450 may determine that $x_{11}'=0.6$, $x_{12}'=0.4$, $x_{21}'=0.3$, and $x_{22}'=0.7$. The recommendation module 450 may determine the threshold as 0.5 and determine that $x_{11}=1$, $x_{12}=0$, $x_{21}=0$, and $x_{22}=1$. For the first activity, the recommendation module 450 may determine the first user as the target user and recommend the first activity to the first user. For the second activity, the recommendation module 450 may determine the second user as the target user and recommend the second activity to the second user.

It should be noted that the processing engine 112 described above is provided for the purposes of illustration, and not intended to limit the scope of the present disclosure. Apparently, for persons having ordinary skills in the art, numerous variations and modifications may be conducted under the teaching of the present disclosure. However, those variations and modifications do not depart the protection scope of the present disclosure. In some embodiments, if the plurality of recommendation parameters are continuous, the preset threshold may be manually changed according to the determination. For example, if the number of $x_{ij}'$ satisfying the one or more conditions is not enough, the preset threshold may be manually changed to a lower value (e.g., 0.4) to obtain more $x_{ij}'$ satisfying the one or more conditions. Similar modifications should fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system for sending activity recommendation to a user terminal, comprising:
an information exchange port of a target system, the target system including a plurality of user terminals connecting to the information exchange port via one or more networks; and
one or more processors of an online on-demand service platform to interact with the target system via the information exchange port,
wherein to interact with the target system, the one or more processors are directed to:
determine one or more recommendation rules for a plurality of activities associated with an on-demand service for recommending to a plurality of candidate users associated with the plurality of user terminals via the online on-demand service platform, wherein each of the one or more recommendation rules includes a plurality of first values and a second value, each of plurality of first values indicates whether one of the plurality of candidate users is qualified, under the recommendation rule, to be recommended to one of the plurality of activities by the online on-demand service platform, the second value being an empirical value related to the recommendation rule or determined based on a weighted operation on the recommendation rule;
for each of the plurality of activities,
determine one or more preset objects for the each of the plurality of activities to achieve for the plurality of candidate users; and for each of the plurality of candidate users, determine a completion probability that the candidate user will complete the one or more preset objects of the each of the plurality of activities;

determining, based on the one or more recommendation rules, and the completion probabilities corresponding to the plurality of candidate users and the plurality of activities, a target recommendation from a plurality of candidate recommendations each of which relates to a way of recommending the plurality of activities to the plurality of candidate users, wherein the target recommendation includes a plurality of third values each of which indicates whether to recommend one of the plurality of activities to one of the plurality of candidate users, a fourth value of a combination of the plurality of third values and the completion probability corresponding to the plurality of candidate users and the plurality of activities is the largest among the plurality of candidate recommendations, and for each of the one or more recommendation rules, a fifth value of a combination of the plurality of first values and the plurality of third values satisfies the second value; and interact with the target system by sending a notice associated with the target recommendation to at least one of the plurality of user terminals of at least one of the plurality of candidate users via the information exchange port, wherein to determine a completion probability that each of the plurality of candidate users will complete the one or more preset objects, the one or more processors are directed to:

obtain an estimation model generated based on recommendation data of a plurality of historical activities; and determine the completion probability based on the estimation model, and wherein the estimation model is generated based on the recommendation data of the plurality of historical activities by:

inputting a plurality of preliminary characteristics of the recommendation data to a deep learning model or a gradient boosting decision tree (GBDT) model;

obtaining a plurality of refined characteristics of the recommendation data by iteratively operating, based on the plurality of preliminary characteristics, the deep learning model or the GBDT model; and generating, based on the refined characteristics, the estimation model.

2. The system of claim 1,
wherein the recommendation data of one of the plurality of historical activities includes at least one of
content of the historical activity,
one or more features of the historical activity,
a type of the historical activity,
an identification of the type of the historical activity,
an identification of a user that the historical activity has been recommended to,
one or more features of the user that the historical activity has been recommended to, or
information indicating whether the user that the historical activity has been recommended to completes one or more preset objects of the historical activity.

3. The system of claim 1, wherein to determine the completion probability based on the estimation model, the one or more processors are directed to:

for each of the one or more preset objects of the activity, determine, based on the estimation model, a probability that the candidate user will complete the preset object of the activity; and determine the completion probability that the candidate user will complete the one or more preset objects of the activity by at least one of:

selecting one of the one or more probabilities as the completion probability;

determining an average value of at least two of the one or more probabilities in response to a determination that a count of the one or more preset object is greater than one; or determining a weighted average value of at least two of the one or more probabilities in response to the determination that the count of the one or more preset object is greater than one.

4. The system of claim 1, wherein to determine the target recommendation, the one or more processors are directed to:

determine a plurality of discrete recommendation parameters each of which indicates whether to recommend one of the plurality of activities to one of the plurality of candidate users;

determine whether all of the one or more recommendation rules are satisfied based on the plurality of discrete recommendation parameters;

determine a sum based on the plurality of discrete recommendation parameters and the completion probabilities corresponding to the plurality of candidate users and the plurality of activities in response to a determination that all of the one or more recommendation rules are satisfied based on the plurality of discrete recommendation parameters;

determine whether the sum is the largest among other discrete recommendation parameters; and in response to determining that the sum is the largest, determine the target recommendation based on the plurality of discrete recommendation parameters.

5. The system of claim 4, wherein to determine the plurality of discrete recommendation parameters, the one or more processors are directed to:

determine the plurality of discrete recommendation parameters for each of the plurality of activities based on a completion probability that each one of the plurality of candidate users will complete the one or more preset objects of the one of the plurality of activities and the one or more recommendation rules.

6. The system of claim 1, wherein to determine the target recommendation, the one or more processors are directed to:

determine a plurality of continuous recommendation parameters each of which indicates a probability of recommending one of the plurality of activities to one of the plurality of candidate users;

determine whether all of the one or more recommendation rules are satisfied based on the plurality of continuous recommendation parameters;

determine a sum based on the plurality of continuous recommendation parameters and the completion probabilities corresponding to the plurality of candidate users and the plurality of activities in response to a determination that all of the one or more recommendation rules are satisfied based on the plurality of continuous recommendation parameters;

determine whether the sum is the largest among other continuous recommendation parameters;

in response to determining that the sum is the largest, determine, based on the plurality of continuous recommendation parameters, a plurality of discrete recommendation parameters each of which indicates whether to recommend one of the plurality of activities to one of the plurality of candidate users; and determine the target recommendation based on the plurality of discrete recommendation parameters.

7. The system of claim 6, wherein to determine the plurality of continuous recommendation parameters, the one or more processors are directed to:

determine the plurality of continuous recommendation parameters for each of the plurality of activities based on a completion probability that each one of the plurality of candidate users will complete the one or more preset objects of the one of the plurality of activities and the one or more recommendation rules.

8. The system of claim 7, wherein to determine the plurality of continuous recommendation parameters, the one or more processors are directed to:

determine the plurality of continuous recommendation parameters based on a Lagrange relaxation algorithm.

9. The system of claim 1, wherein the preset object of the activity includes at least one of an introduction of one or more new users to the online on-demand service platform based on the activity, a scan of the activity, or consumption based on the activity.

10. A method for sending activity recommendation to a user terminal implemented on a computing device of an online on-demand service platform having one or more processors and one or more storage media, the method comprising:

determining one or more recommendation rules for a plurality of activities associated with an on-demand service for recommending to a plurality of candidate users associated with a plurality of user terminals via the online on-demand service platform, wherein each of the one or more recommendation rules includes a plurality of first values and a second value, each of plurality of first values indicates whether one of the plurality of candidate users is qualified, under the recommendation rule, to be recommended to one of the plurality of activities by the online on-demand service platform, the second value being an empirical value related to the recommendation rule or determined based on a weighted operation on the recommendation rule;

for each of the plurality of activities, determining one or more preset objects for the each of the plurality of activities to achieve for the plurality of candidate users; and for each of the plurality of candidate users, determining a completion probability that the candidate user will complete the one or more preset objects of the each of the plurality of activities;

determining, based on the one or more recommendation rules, and the completion probabilities corresponding to the plurality of candidate users and the plurality of activities, a target recommendation from a plurality of candidate recommendations each of which relates to a way of recommending the plurality of activities to the plurality of candidate users, wherein the target recommendation includes a plurality of third values each of which indicates whether to recommend one of the plurality of activities to one of the plurality of candidate users, a fourth value of a combination of the plurality of third values and the completion probability corresponding to the plurality of candidate users and the plurality of activities is the largest among the plurality of candidate recommendations, and for each of the one or more recommendation rules, a fifth value of a combination of the plurality of first values and the plurality of third values satisfies the second value; and interacting with a target system including the plurality of user terminals connecting to an information exchange port via one or more networks by sending a notice associated with the target recommendation to at least one of the plurality of user terminals of at least one of the plurality of candidate users via the information exchange port, wherein the determining a completion probability that each of the plurality of candidate users will complete the one or more preset objects includes:

obtaining an estimation model generated based on the recommendation data of a plurality of historical activities; and determining the completion probability based on the estimation model, and wherein the estimation model is generated based on the recommendation data of the plurality of historical activities by:

inputting a plurality of preliminary characteristics of the recommendation data to a deep learning model or a gradient boosting decision tree (GBDT) model;

obtaining a plurality of refined characteristics of the recommendation data by iteratively operating, based on the plurality of preliminary characteristics, the deep learning model or the GBDT model; and generating, based on the refined characteristics, the estimation model.

11. The method of claim 10, wherein the recommendation data of one of the plurality of historical activities includes at least one of content of the historical activity, one or more features of the historical activity, a type of the historical activity, an identification of the type of the historical activity, an identification of a user that the historical activity has been recommended to, one or more features of the user that the historical activity has been recommended to, or information indicating whether the user that the historical activity has been recommended to completes one or more preset objects of the historical activity.

12. The method of claim 10, wherein the determining the completion probability based on the estimation model includes for each of the one or more preset objects of the activity, determining, based on the estimation model, a probability that the candidate user will complete the preset object of the activity; and determining the completion probability that the candidate user will complete the one or more preset objects of the activity by at least one of:

selecting one of the one or more probabilities as the completion probability;

determining an average value of at least two of the one or more probabilities in response to a determination that a count of the one or more preset object is greater than one; or determining a weighted average value of at least two of the one or more probabilities in response to the determination that the count of the one or more preset object is greater than one.

13. The method of claim 10, wherein determining the target recommendation comprises:
   determining a plurality of discrete recommendation parameters each of which indicates whether to recommend one of the plurality of activities to one of the plurality of candidate users;
   determining whether all of the one or more recommendation rules are satisfied based on the plurality of discrete recommendation parameters;
   determining a sum based on the plurality of discrete recommendation parameters and the completion probabilities corresponding to the plurality of candidate users and the plurality of activities in response to a determination that all of the one or more recommendation rules are satisfied based on the plurality of discrete recommendation parameters;
   determining whether the sum is the largest among other discrete recommendation parameters; and
   in response to determining that the sum is the largest, determining the target recommendation based on the plurality of discrete recommendation parameters.

14. The method of claim 13, wherein the determining of the plurality of discrete recommendation parameters comprises:
   determining the plurality of discrete recommendation parameters for each of the plurality of activities based on a completion probability that each one of the plurality of candidate users will complete the one or more preset objects of the one of the plurality of activities and the one or more recommendation rules.

15. The method of claim 10, wherein determining the target recommendation comprises:
   determining a plurality of continuous recommendation parameters each of which indicates a probability of recommending one of the plurality of activities to one of the plurality of candidate users;
   determining whether all of the one or more recommendation rules are satisfied based on the plurality of continuous recommendation parameters;
   determining a sum based on the plurality of continuous recommendation parameters and the completion probabilities corresponding to the plurality of candidate users and the plurality of activities in response to a determination that all of the one or more recommendation rules are satisfied based on the plurality of continuous recommendation parameters;
   determining whether the sum is the largest among other continuous recommendation parameters;
   in response to determining that the sum is the largest, determining, based on the plurality of continuous recommendation parameters, a plurality of discrete recommendation parameters each of which indicates whether to recommend one of the plurality of activities to one of the plurality of candidate users; and
   determining the target recommendation based on the plurality of discrete recommendation parameters.

16. The method of claim 15, wherein the determining of the plurality of continuous recommendation parameters comprises:
   determining the plurality of continuous recommendation parameters for each of the plurality of activities based on a completion probability that each one of the plurality of candidate users will complete the one or more preset objects of the one of the plurality of activities and the one or more recommendation rules.

17. The method of claim 16, wherein the determining of the plurality of continuous recommendation parameters comprises:
   determining the plurality of continuous recommendation parameters based on a Lagrange relaxation algorithm.

18. A non-transitory computer readable medium, comprising at least one set of instructions for operating an online on-demand service platform, wherein when executed by one or more processors of a computing device, the at least one set of instructions causes the computing device to perform a method, the method comprising:
   determining one or more recommendation rules for a plurality of activities associated with an on-demand service for recommending to a plurality of candidate users associated with a plurality of user terminals via the online on-demand service platform, wherein each of the one or more recommendation rules includes a plurality of first values and a second value, each of plurality of first values indicates whether one of the plurality of candidate users is qualified, under the recommendation rule, to be recommended to one of the plurality of activities by the online on-demand service platform, the second value being an empirical value related to the recommendation rule or determined based on a weighted operation on the recommendation rule;
   for each of the plurality of activities,
      determining one or more preset objects for the each of the plurality of activities to achieve for the plurality of candidate users; and
      for each of the plurality of candidate users, determining a completion probability that the candidate user will complete the one or more preset objects of the each of the plurality of activities;
   determining, based on the one or more recommendation rules, and the completion probabilities corresponding to the plurality of candidate users and the plurality of activities, a target recommendation from a plurality of candidate recommendations each of which relates to a way of recommending the plurality of activities to the plurality of candidate users, wherein
      the target recommendation includes a plurality of third values each of which indicates whether to recommend one of the plurality of activities to one of the plurality of candidate users,
      a fourth value of a combination of the plurality of third values and the completion probability corresponding to the plurality of candidate users and the plurality of activities is the largest among the plurality of candidate recommendations, and
      for each of the one or more recommendation rules, a fifth value of a combination of the plurality of first values and the plurality of third values satisfies the second value;
   interacting with a target system including the plurality of user terminals connecting to an information exchange port via one or more networks by sending a notice associated with the target recommendation to at least one of the plurality of user terminals of at least one of the plurality of candidate users via the information exchange port,
   wherein the determining a completion probability that each of the plurality of candidate users will complete the one or more preset objects includes:

obtaining an estimation model generated based on the recommendation data of a plurality of historical activities; and determining the completion probability based on the estimation model, and wherein the estimation model is generated based on the recommendation data of the plurality of historical activities by:

inputting a plurality of preliminary characteristics of the recommendation data to a deep learning model or a gradient boosting decision tree (GBDT) model;

obtaining a plurality of refined characteristics of the recommendation data by iteratively operating, based on the plurality of preliminary characteristics, the deep learning model or the GBDT model; and generating, based on the refined characteristics, the estimation model.

19. The system of claim 1, wherein the one or more recommendation rules include at least one of a count of candidate users of the plurality of candidate users allowed to receive a target activity of the plurality of activities is not greater than a first threshold, a count of activities of the plurality of activities allowed to be recommended to a same candidate user of the plurality of candidate users is not greater than a second threshold, or a specific type of activities of the plurality of activities are allowed to be recommended to a specific type of candidate users of the plurality of candidate users.

20. The system of claim 19, wherein the first threshold is less than a count of the plurality of candidate users; or the second threshold is less than a count of the plurality of activities.

* * * * *